March 26, 1968 G. B. JACOBY ET AL 3,374,628
BALL AND RAMP TYPE MASTER CYLINDER
Filed Oct. 23, 1965

INVENTORS
Gerald B. Jacoby
Frank W. Brooks
BY
Donald P. Selvecki
THEIR ATTORNEY

United States Patent Office 3,374,628
Patented Mar. 26, 1968

3,374,628
BALL AND RAMP TYPE MASTER CYLINDER
Gerald B. Jacoby and Frank W. Brooks, Dayton, Ohio, assignors to General Motors Corporation, Detroit, Mich., a corporation of Delaware
Filed Oct. 23, 1965, Ser. No. 503,300
1 Claim. (Cl. 60—54.6)

ABSTRACT OF THE DISCLOSURE

This invention teaches a master cylinder for a vehicle braking system in which an actuator is rotated along the longitudinal axis of the piston in the master cylinder. This rotational movement generated in the piston is converted to a linear movement of the piston along its longitudinal axis by means of balls positioned in tear drop shaped ramps on the piston acting against a stator wall to advance the piston when it is rotated.

---

This invention relates to force developing mechanisms and more particularly to an hydraulic master cylinder developing a braking pressure in response to movement of a rotating power piston.

Hydraulic master cylinders of common design are generally elongated in shape and develop a pressure for a braking system in response to an axially moving piston. The axial movement of the piston is normally provided by a linearly moving actuator. This requires linkage mechanism for the suspension of a brake pedal to generate a linear force and requires a piston in an hydraulic cylinder of relatively small cross sectional area responding to relatively large linear movement of an actuator. It is desirable in vehicles of present day design to economize on the space utilized by functional components as well as keeping the functional components as simple as possible to minimize their manufacturing cost.

It is an object of the present invention to provide an improved force developing mechanism which responds directly to rotational movement of an actuator to generate hydraulic pressure.

It is another object of the present invention to provide an improved hydraulic master cylinder which develops a braking pressure directly in response to rotational or pivotal movement of an actuator in a power chamber having a slim overall dimension.

It is still another object of the present invention to provide an improved hydraulic master cylinder which has a compensating port carried in a piston which is spirally moved in a power developing direction in response to rotation of balls cooperating with ramps formed on a non-power developing portion of the piston.

A further object of the present invention is to carry out the aforementioned objects in a simple and economical manner.

Further objects and advantages of the present invention will be apparent from the following description, reference being had to the accompanying drawings wherein a preferred embodiment of the present invention is clearly shown.

Figure 1:
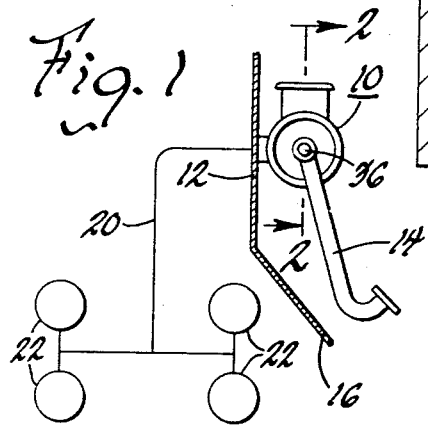
FIGURE 1 shows the subject invention in its operative environment.

Referring to FIGURE 1, an hydraulic master cylinder housing 10 is illustrated as being carried on a fire wall 12 inside the driving compartment of a vehicle. It is understood that housing 10 can be positioned on either side of fire wall 12 but the slim line of the subject invention makes it easily installed in the driving compartment. Pedal 14 is illustrated as being pivotally mounted along the longitudinal axis of housing 10 and is movable toward toeboard 16 to generate a braking pressure. Housing 10 has an outlet 18 engaging brake lines 20 in a conventional manner to communicate a braking pressure to vehicle wheel brakes 22.

Figure 2:
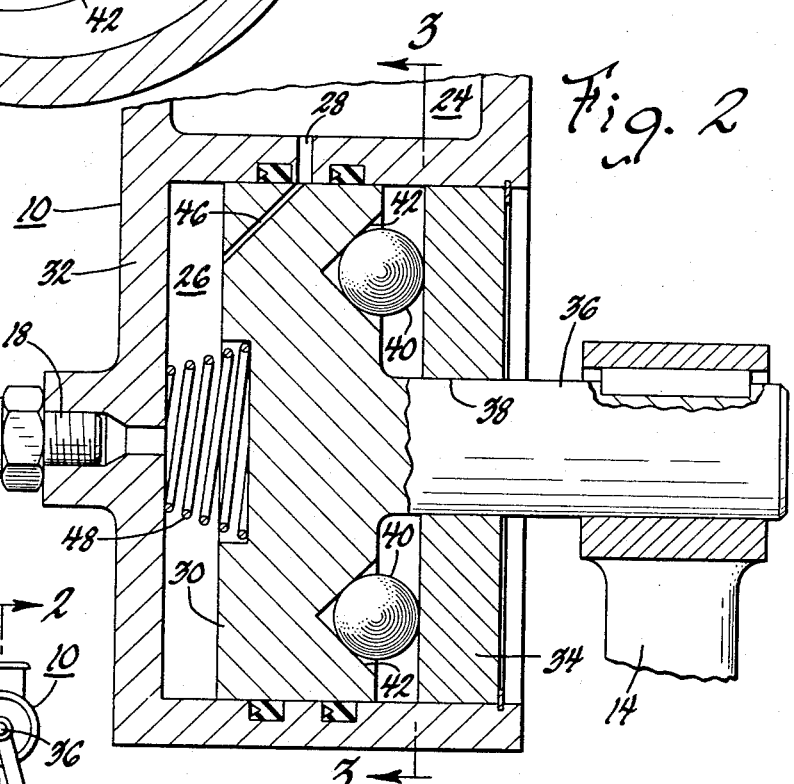
FIGURE 2 is an enlarged sectional view of the subject invention taken along line 2—2 of FIGURE 1.

Referring to FIGURE 2, housing 10 includes a reservoir 24 and a power chamber 26. First passage 28 provides a path for fluid communication between reservoir 24 and power chamber 26. Piston 30 is reciprocable in power chamber 26 between wall 32 and wall 34 in response to rotational movement thereof induced by a pivoting of actuator means or pedal 14. Piston 30 includes an extension 36 piloted in aperture 38 of wall 34. Balls 40 are carried in arcuately disposed teardrop shaped grooves 42 formed on a non-power side of piston 30 and cooperate with wall 34 of housing 10 to thrust piston 30 toward wall 32 when actuator means 14 causes rotation of extension 36.

Figure 3:
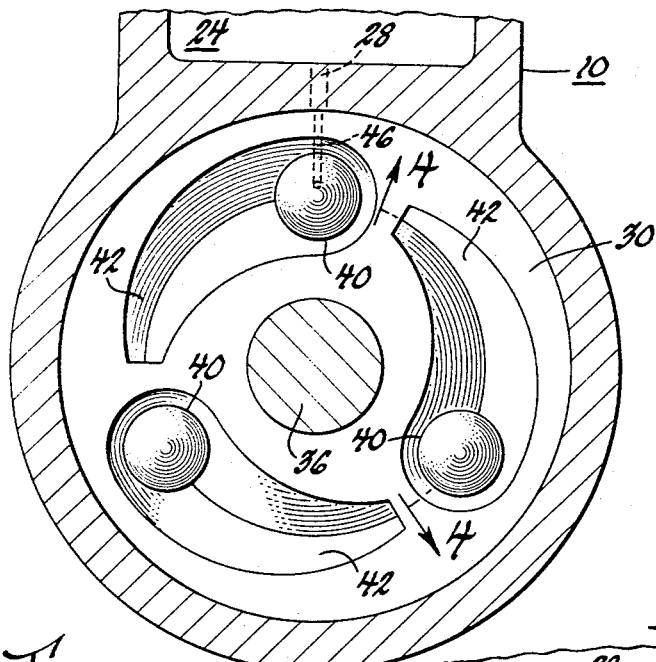
FIGURE 3 is a sectional view taken along line 3—3 of FIGURE 2.
Figure 4:
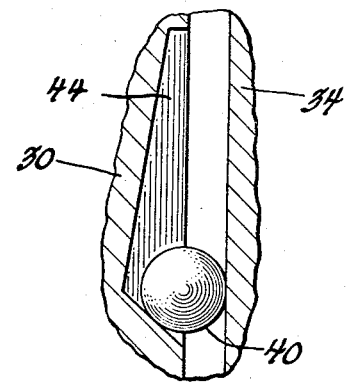
FIGURE 4 is an arcuate section taken along line 4—4 of FIGURE 3.

Referring to FIGURE 3, grooves 42 are more clearly seen as being arcuately disposed on the non-power face of piston 30 and form pockets for the operative retention of balls 40 during rotation of piston 30. Referring to FIGURE 4, grooves 42 are seen as having an inclined ramp portion 44 which causes the teardrop shape illustrated in FIGURE 3. Therefore, it is that the depth of grooves 42 varies which results in a friction developing between the balls 40 and the associated ramp 44 and wall 34 causing a movement of piston 30 away from wall 34 when piston 30 is rotated. The inclined ramp portion 44 of groove 42 should preferably have an inclination of 3° to 16° relative to the face of the non-powered side of piston 30 to insure separation of piston 30 from wall 34 when rotated. It is understood that it is completely within the inventive concept disclosed herein to provide either a frictional surface on wall 34 exposed to ball 40 or to provide a pocket in wall 34 to retain ball 40 if it becomes desirable in a given installation to increase the inclination of ramp 44.

In operation, a brake actuation is initiated by the pivoting of pedal 14 toward toeboard 16 as viewed in FIGURE 1. This results in a clockwise rotation of extension 36. Referring to FIGURE 3, clockwise rotation of extension 36 causes a rolling action to develop between ball 40 and wal 34. Grooves 42 engaging balls 40 during this rolling movement causes ball 40 to roll up ramp portion 44 thereby driving piston 30 toward wall 32.

Referring to FIGURE 2, when piston 30 is thrust forward and advances toward wall 32 pressure is developed in power chamber 26 which is freely communicated to outlet 18 and to the vehicle brakes. It should be noted that, as piston 30 moves forward, second passage 46 moves out of alignment with first passage 28 shutting off free fluid communication between reservoir 24 and power chamber 26.

When the actuating force is released from pedal 14, spring 48 becomes the dominant force acting on piston 30 and, along with the pressure trapped in the brake lines, initiates a spiralling return movement in piston 30. Pedal 14 is thereby returned to a poised position and, upon return to the poised position, second passage 46 becomes realigned with first passage 28. In this manner, if a fluid need exists in power chamber 26, a negative pressure in chamber 26 will have been developed which will draw fluid through passage 46 and passage 28 from reservoir 24. This allows fluid compensation to take place.

The utility of the subject mechanism is clear in an environment where it is desirable to locate the hydraulic master cylinder within the driving compartment or when the space available anywhere in the vehicle requires a compact, slim line design for a master cylinder. In addition to this, the pivoting of a brake pedal along the longitudinal axis of a power piston results in a maximum mechanical advantage between the brake pedal and the power piston. Therefore, a power piston of greater cross sectional area can be utilized for manual operation of an hydraulic cylinder resulting in a more efficient system. The ball and ramp type clutching arrangement between the power piston and the cylinder wall results in direct and immediate pressure build-up in the master cylinder contributing to its overall efficiency.

While the embodiment of the present invention, as herein disclosed, constitutes a preferred form, it is to be understood that other forms might be adopted.

What is claimed is as follows:

1. A brake master cylinder comprising:
   a housing having
       a brake fluid reservoir,
       a closed cylinder the walls of which are defined by said housing,
       a fluid compensation port fluid connecting said reservoir and said cylinder, and
       a pressurized fluid outlet in a cylinder wall and connected with said cylinder and adapted to be connected to a hydraulic pressure operated brake;
   a piston received in said cylinder and mounted for linear and rotary movement therein and having
       a stem extending through one cylinder wall,
       a first face surface facing the one cylinder wall, and
       a second face surface cooperating with the cylinder walls other than the one cylinder wall to define therewith a fluid pressurizing chamber;
   said piston cooperating with said compensation port to fluid connect said reservoir and said chamber when said chamber is at its maximum volume and to disconnect said reservoir and said chamber upon piston movement relative to the one cylinder wall;
   spring means exerting force yieldably urging said piston toward the one cylinder wall and resisting linear piston movement in the cylinder tending to decrease the volume of the chamber;
   a master cylinder actuator connected to said piston stem and when operated rotating said piston in said cylinder;
   and cam means including
       arcuate teardrop shaped grooves formed in the first piston face surface and inclined from one extremity toward an opposite extremity in an arcuate path to provide inclined planes, and
       balls carried in said grooves and contacting the inclined planes and said one cylinder wall and being in frictional rolling engagement with said inclined planes,
   said cam means acting to axially move said piston to pressurize fluid in said chamber and said outlet.

References Cited

UNITED STATES PATENTS

| 1,531,234 | 3/1925 | Davis | 92—116 X |
| 1,866,217 | 7/1932 | Mayer | 103—157 |
| 2,163,874 | 6/1939 | Goepfrich | 60—54.6 X |
| 2,242,542 | 5/1941 | Peterson et al. | 60—54.6 X |
| 2,254,937 | 9/1941 | Dick | 60—54.6 |
| 2,296,864 | 9/1942 | Morrison | 60—54.6 X |
| 2,374,672 | 5/1945 | Farris | 60—54.6 |
| 2,566,571 | 9/1951 | Leland | 74—89 |
| 2,942,580 | 6/1960 | Siravo | 92—31 |

FOREIGN PATENTS 742,886    12/1943    Germany.

MARTIN P. SCHWADRON, *Primary Examiner.*

I. C. COHEN, *Assistant Examiner.*